(12) United States Patent
Bohn (10) Patent No.: US 11,390,124 B2
(45) Date of Patent: Jul. 19, 2022

(54) EDGE GUARD FOR NON-PNEUMATIC WHEEL

(71) Applicants: COMPAGNIE GENERALE DES ETABLISSEMENTS MICHELIN, Clermont-Ferrand (FR); Clay Bohn, Mauldin, SC (US)

(72) Inventor: Clay Bohn, Mauldin, SC (US)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 183 days.

(21) Appl. No.: 16/627,043

(22) PCT Filed: Jun. 26, 2018

(86) PCT No.: PCT/US2018/039538
§ 371 (c)(1),
(2) Date: Dec. 27, 2019

(87) PCT Pub. No.: WO2019/005821
PCT Pub. Date: Jan. 3, 2019

(65) Prior Publication Data
US 2020/0198413 A1 Jun. 25, 2020

Related U.S. Application Data

(63) Continuation of application No. PCT/US2017/040388, filed on Jun. 30, 2017.

(51) Int. Cl.
*B60C 19/08* (2006.01)
*B60C 7/18* (2006.01)
(Continued)

(52) U.S. Cl.
CPC .............. *B60C 19/08* (2013.01); *B60C 7/18* (2013.01); *B60B 9/04* (2013.01); *B60C 7/146* (2021.08)

(58) Field of Classification Search
CPC .......... B60C 19/08; B60C 7/18; B60C 7/146; B60C 7/22; B60C 2007/146; B60B 9/04
See application file for complete search history.

(56) References Cited

U.S. PATENT DOCUMENTS

| | | |
|---|---|---|
| 2,896,687 A | 7/1959 | Smith et al. |
| 6,450,222 B1 | 9/2002 | Fleming |

(Continued)

FOREIGN PATENT DOCUMENTS

| | | |
|---|---|---|
| CN | 104395102 A | 3/2015 |
| CN | 104626876 A | 5/2015 |

(Continued)

OTHER PUBLICATIONS

Chinese Office Action Corresponding to Application No. 201880042948 dated May 14, 2021.

(Continued)

*Primary Examiner* — Kip T Kotter
(74) *Attorney, Agent, or Firm* — Dority & Manning, P.A.

(57) ABSTRACT

A non-pneumatic wheel having one or more features for protecting edges of a support structure located radially between a wheel hub and an annular shear band. A softer material is provided along certain edges of the support structure for providing resistance to damages from incidental impact. One or more electrically conductive features may also be provided to reduce or prevent the accumulation of electrical charge on a vehicle using the non-pneumatic wheel.

14 Claims, 8 Drawing Sheets

(51) Int. Cl.
*B60B 9/04* (2006.01)
*B60C 7/14* (2006.01)

(56) References Cited

U.S. PATENT DOCUMENTS

| | | | |
|---|---|---|---|
| 8,109,308 | B2 | 2/2012 | Manesh et al. |
| 2004/0159385 | A1* | 8/2004 | Rhyne ...................... B60B 9/04 152/197 |
| 2009/0065114 | A1* | 3/2009 | Pringiers ................... B60C 7/00 152/152.1 |
| 2012/0193004 | A1 | 8/2012 | Anderson et al. |
| 2013/0048174 | A1 | 2/2013 | Cron |
| 2017/0334245 | A1* | 11/2017 | Laskowitz .............. B60C 7/125 |
| 2017/0368877 | A1 | 12/2017 | Gaylo et al. |
| 2019/0030964 | A1* | 1/2019 | Narowski ................ C08K 3/04 |

FOREIGN PATENT DOCUMENTS

| | | | |
|---|---|---|---|
| CN | 105172470 | A | 12/2015 |
| CN | 205273056 | | 6/2016 |
| JP | 2014125082 | A * | 7/2014 |
| JP | 2015/120393 | A | 7/2015 |
| WO | WO2016099480 | | 6/2016 |
| WO | WO2017072562 | | 5/2017 |
| WO | WO2017086993 | | 5/2017 |

OTHER PUBLICATIONS

International Search Report and Written Opinion Thereof, PCT Application No. PCT/US2018/039538, dated Oct. 29, 2018, 13 pages.

* cited by examiner

EDGE GUARD FOR NON-PNEUMATIC WHEEL

PRIORITY STATEMENT

The present application claims priority under 35 U.S.C. § 119 to PCT/US2017/040388, filed Jun. 30, 2017.

FIELD OF THE INVENTION

The subject matter of the present disclosure relates to a non-pneumatic wheel or tire having protective features applied along one or both sides of support structure positioned radially between a hub and an annular shear band.

BACKGROUND OF THE INVENTION

The pneumatic tire is a known solution for compliance, comfort, mass, and rolling resistance. However, the pneumatic tire has disadvantages in complexity, the need for maintenance, and susceptibility to damage. A device that improves on pneumatic tire performance could, for example, provide more compliance, better control of stiffness, lower maintenance requirements, and resistance to damage.

Non-pneumatic tire or wheel constructions provide certain such improvements. The details and benefits of non-pneumatic tire or non-pneumatic wheel constructions are described in e.g., U.S. Pat. Nos. 6,769,465; 6,994,134; 7,013,939; and 7,201,194. Certain non-pneumatic tire and wheel constructions propose incorporating an annular shear band, embodiments of which are described in e.g., U.S. Pat. Nos. 6,769,465 and 7,201,194. Such non-pneumatic tire and wheel constructions provide advantages in performance without relying upon a gas inflation pressure for support of the loads applied to the tire or wheel.

For example, U.S. Pat. No. 6,769,465 relates to a structurally supported resilient tire that supports a load without internal air pressure. In an exemplary embodiment, this non-pneumatic tire includes a ground contacting portion and side wall portions that extend radially inward from the tread portion and anchor in bead portions that are adapted to remain secure to a wheel during rolling of the tire. A reinforced annular band is disposed radially inward of the tread portion. This shear band includes at least one homogenous shear layer, a first membrane adhered to the radially inward extent of the shear layer and a second membrane adhered to the radially outward extent of the shear layer. Each of the membranes has a longitudinal tensile modulus sufficiently greater than the dynamic shear modulus of the shear layer so that, when under load, the ground contacting portion of the tire deforms to a flat contact region through shear strain in the shear layer while maintaining constant length of the membranes. Relative displacement of the membranes occurs substantially by shear strain in the shear layer. The invention of U.S. Pat. No. 6,769,465 provides several advantages including, for example, the ability to operate without an inflation pressure and the flexibility to adjust the vertical stiffness of the tire somewhat independently of the ground contact pressure.

Certain non-pneumatic constructions make use of load bearing members sometimes in the form of a web or spoke. These members can transmit an applied load to the annular shear band through e.g., tension. These members may be constructed from materials that are susceptible to small cuts, nicks, or dents from incidental contact with other objects. This can provide an unpleasing aesthetic appearance and potentially serve as initiation points for cracks and tears in the member. A non-pneumatic tire construction having one or more features for minimizing or preventing such damage would be useful.

Vehicles accumulate static electrical charge when driven. If there is sufficient electrical conductivity between the vehicle and ground through the tires then the charge will be continually depleted. However, if the electrical resistance between the ground and vehicle through the tires is too great the vehicle will retain an electrical charge for a significant amount of time once the vehicle has stopped moving. A person may be shocked when touching the vehicle such as when he or she grasps the door handle to open or close the door. It is known to incorporate carbon black into the rubber of tires in order to provide electrical conductivity to the tire to prevent or reduce shock. However, the addition of carbon black to the sidewalls of tires may increases hysteresis and in turn may increase rolling resistance and heat generation. Non-pneumatic tires may include elements that are made of polyurethane, which has less electrical conductivity than the material making up pneumatic tires, and therefore non-pneumatic tires may have higher static charge retention than pneumatic tires.

Accordingly, a non-pneumatic tire construction having one or more features for minimizing for preventing the damage mentioned above as well as one or more features for reducing the build-up of electrical charge on the vehicle would also be useful.

SUMMARY OF THE INVENTION

The present invention provides a non-pneumatic wheel having one or more features for protecting edges of a support structure located radially between a wheel hub and an annular shear band. A softer and more durable material is provided along certain edges of the support structure for providing resistance to damages from incidental impact. One or more electrically conductive features may also be provided to reduce or prevent the accumulation of electrical charge on a vehicle using the non-pneumatic wheel. Additional objects and advantages of the invention will be set forth in part in the following description, or may be apparent from the description, or may be learned through practice of the invention.

In one exemplary embodiment, a non-pneumatic wheel is provided defining axial, radial, and circumferential directions. The non-pneumatic wheel includes a cylindrically-shaped hub extending along the axial direction between opposing sides of the wheel. A compliant, load supporting annular shear band is positioned radially-outward of the hub and concentric with the hub. A support structure is positioned radially-outward of the cylindrically-shaped hub and radially-inward of the annular shear band. The support structure includes a plurality of spokes extending transversely over the hub between opposing sides of the wheel, each spoke having at least a pair of edges and a main body portion, wherein for each spoke at least one of the edges includes an edge guard portion having a lower Shore hardness than the main body portion.

In another exemplary embodiment of the present invention, a non-pneumatic wheel is provided that defines axial, radial, and circumferential directions. The non-pneumatic wheel includes a cylindrically-shaped hub extending along the axial direction between opposing sides of the wheel. A compliant, load supporting annular shear band is positioned radially-outward of the hub and concentric with the hub. A support structure is positioned radially-outward of the cylindrically-shaped hub and radially-inward of the annular shear band. The support structure includes a plurality of spokes extending transversely over the hub between opposing sides of the wheel. Such spokes may extend, for example, parallel to the axial direction or at angles therefrom. Each spoke has a main body portion located between a pair of edges with each edge located along one of the opposing sides of the wheel. For each spoke, at least one of the edges includes an edge guard portion having a lower rigidity than the main body portion. For example, at least one of the edges has an edge guard portion having a lower Shore hardness than the main body portion.

The non-pneumatic wheel may include one or more static discharge elements for conducting electricity from the vehicle to reduce build-up of electrical charge.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of the same or similar reference numerals in different figures denotes the same or similar features.

DETAILED DESCRIPTION

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

As used herein, the following definitions apply.

Axial direction A refers to a direction parallel to a central axis CA about which a referenced exemplary non-pneumatic wheel rotates during use.

Radial direction R refers to a direction perpendicular to the central axis with radially-outer or radially outward referring to a general direction away from the central axis CA, and radially-inner or radially inward referring to a general direction towards the central axis CA.

Circumferential direction C refers to a direction defined by the circumference of the wheel or the direction of its rotation about an axis such as central axis CA.

Shore hardness refers to the hardness of a material as measured using a durometer pursuant to ASTM D2240, which is a publicly available and known industry standard for hardness testing. Shore A and Shore D refer to two different durometer scales for specifying hardness as set forth by ASTM D2240.

The ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

Figure 1:
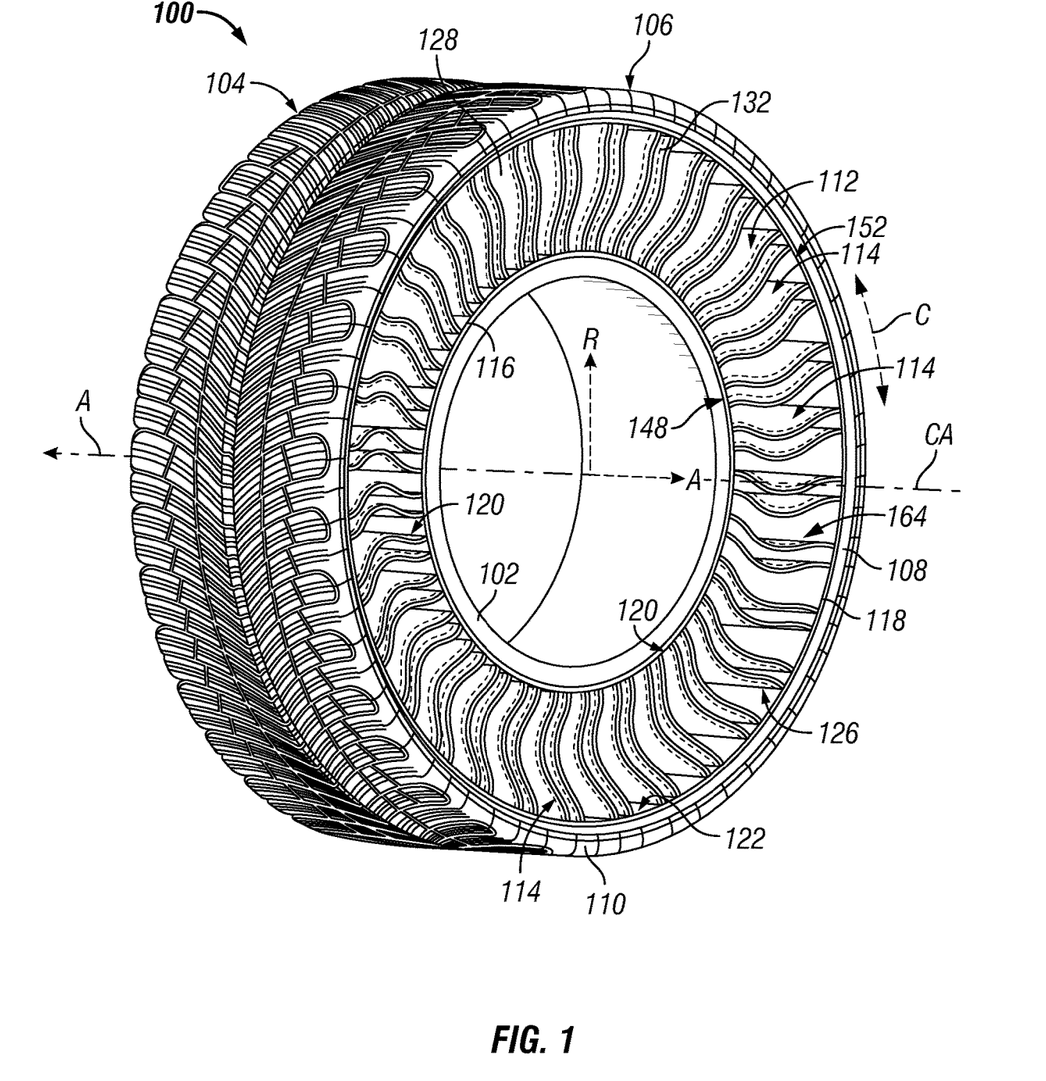
FIG. 1 illustrates a perspective view of an exemplary embodiment of a non-pneumatic wheel of the present invention.

FIG. 1 provides a perspective view of an exemplary embodiment of a tire or non-pneumatic wheel 100 as may be used with the present invention. Non-pneumatic wheel 100 includes a cylindrically-shaped hub 102 extending along axial direction A between opposing sides 104 and 106 of wheel 100. By way of example, hub 102 may be provided with, or attached to, other features for mounting wheel 100 to a spindle or axle of a vehicle. In one exemplary embodiment, hub 102 is attached to a disk that can be mounted onto a spindle or axle of a vehicle.

A compliant, load supporting annular shear band 108 is positioned radially outward of hub 102 and is concentric with hub 102. Annular shear band 108 may be constructed e.g., with one or more reinforcing bands or membranes having a shear layer between the reinforcing bands. Alternatively, for example, the reinforcement elements may not be in bands and may be randomly positioned. Such shear layer may be constructed e.g. of an elastomeric material such as e.g., natural and synthetic rubbers, polyurethanes, foamed rubbers, foamed polyurethanes, segmented copolyesters, and block co-polymers of polyamides such as co-polyamides or polyethere block amides. The reinforcing bands may include reinforcements constructed from e.g., essentially inextensible cord reinforcements embedded in an elastomeric coating. For example, such cord reinforcements may each have a compressive modulus of at least 3 GPa or more. Such reinforcements may include e.g., any of several materials suitable for use as tire belt reinforcements in conventional tires such as cords of steel, composites of glass and resin such as e.g., fiberglass reinforced plastics, and other materials having a high modulus in tension and compression. Other constructions and materials may be used as well. A tread 110 may be formed on, adhered to, or provided as part of, annular shear band 108. A variety of shapes and patterns may be used for tread 110 in addition to what is shown in the figures.

Non-pneumatic wheel 100 includes a support structure, indicated generally at 112, that is positioned radially-outward of cylindrically-shaped hub 102 and radially-inward of the annular shear band 108. Support structure 112 has a radially-inner end 148 and a radially-outer end 152. Support structure 112 includes a plurality of spokes 114 that extend transversely over hub 102 along axial direction A between opposing sides 104 and 106 of non-pneumatic wheel 100.

For this exemplary embodiment, spokes 114 are configured as web-like elements that also extend along radial direction R between hub 102 and annular shear band 108. Spokes 114 are adjacent to one another and spaced apart about circumferential direction C of wheel 100. During use, annular shear band 108 supports loads transmitted to non-pneumatic wheel 100 when mounted to a vehicle. The load is transmitted by tension, compression, or both through spokes 114 to the compliant, annular shear band 108. In one exemplary embodiment, as wheel 100 rotates, spokes 114 may be in tension as they reach the top of wheel 100 at a position away from the contact patch while spokes 114 near the contact patch may experience minimal tension or even compression, may even slightly buckle or bend, and may provide some support as spokes 114 are compressed.

In this embodiment, support structure 112 includes an inner interface ring 116 and an outer interface ring 118 that is positioned radially-outward from inner interface ring 116 with each ring 116 and 118 concentric with hub 102. A radially-inner end 120 of each spoke 114 is connected to inner interface ring 116 while a radially-outer end 122 of each spoke 114 is connected to outer interface ring 118.

Figure 2:
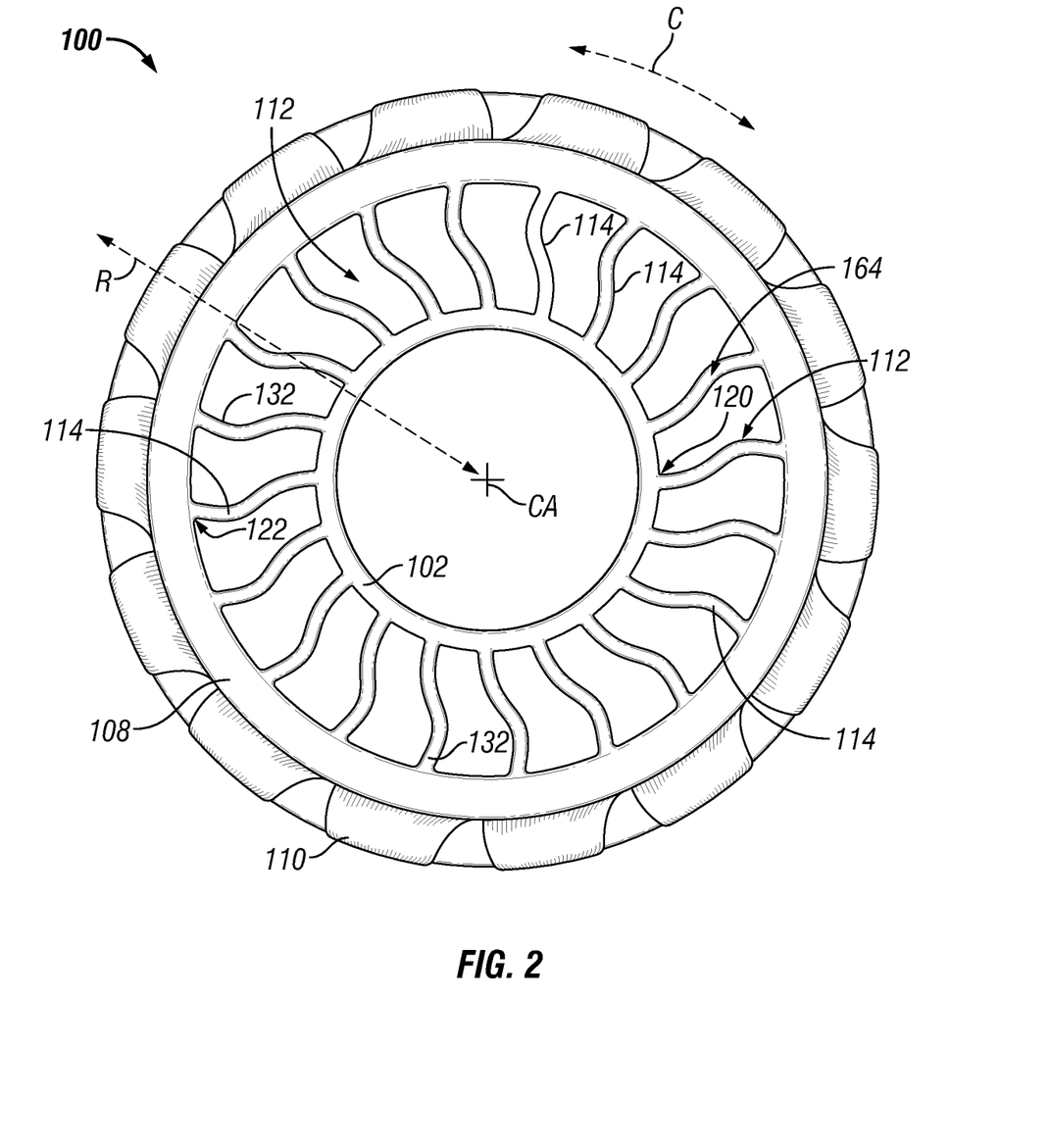
FIG. 2 illustrates a side view of another exemplary embodiment of a non-pneumatic wheel of the present invention.

Support structure 112 is not limited to the particular support structure 112 with spokes 114 shown in the figures as other shapes and configurations may be used. For example, spokes 114 may also be formed at various angles from radial direction R, may include one or more bends, may form a honeycomb-like structure, and other configurations that extend about circumferential direction C. By way of example, FIG. 2 provides a side view of another exemplary embodiment of a non-pneumatic wheel 100 where reference numbers identical to FIG. 1 denote the same or similar features. For this embodiment, support structure 112, including spokes 114, is connected directly with hub 102 and annular shear band 108 without rings 116 and 118.

Figure 3:
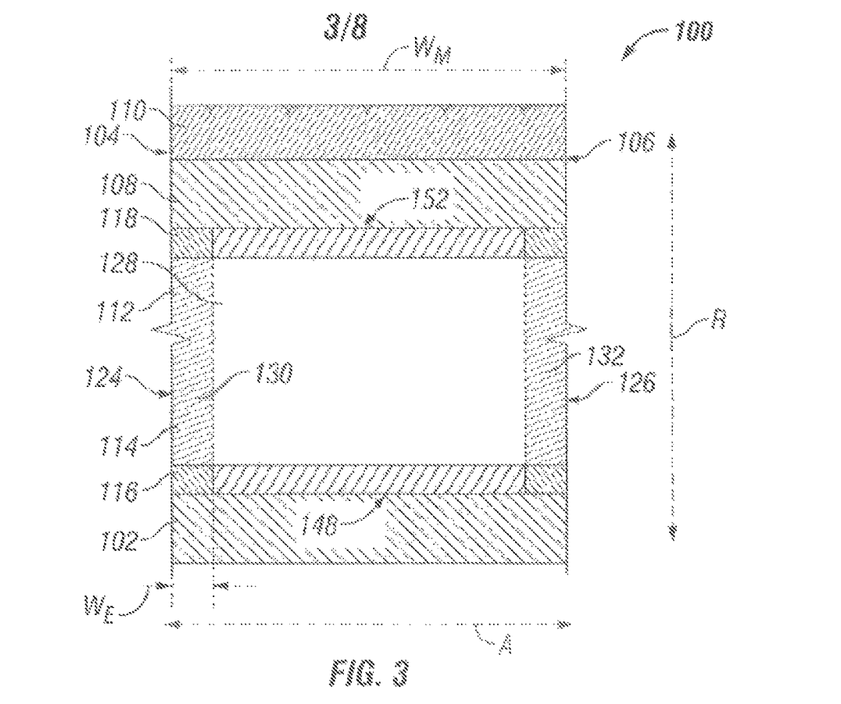
FIG. 3 provides a schematic, cross-sectional view of the exemplary embodiment of a non-pneumatic wheel depicted in FIG. 1.

FIG. 3 provides a schematic, cross-sectional view of non-pneumatic wheel 100 along circumferential direction C between a pair of spokes 114 where none of the spokes 114 is cross-sectioned. Non-pneumatic wheel 100 includes one or more features for protecting one or both lateral edges 124, 126 of spokes 114 along opposing sides 104 and 106 of wheel 100.

More particularly, for this exemplary embodiment, each spoke 114 includes a main body portion 128 located along axial direction A between opposing edge guard portions 130 and 132. The edge guard portions 130 and 132 are each constructed from a material having a lower Shore hardness than main body portion 128. By using a softer material along edge guard portions 130 and 132, spokes 114 can absorb and protect the harder and more rigid main body portion 128 of each spoke 114. Although the embodiment of FIG. 3 depicts edge guard portions 130 and 132 along each opposing lateral edge 124 and 126, in other exemplary embodiments spokes 114 may only have an edge guard portion containing softer material along only one lateral edge 124 or 126 of each spoke 114. For such embodiment, the edge guard portions would all be located on the same side 104 or 106 or the tire. In still other embodiments, a spoke 114 may have more than a pair of edges and, in such case, one or more of such edges may be equipped with an edge guard portion having a lower Shore hardness than the main body portion.

In certain embodiments, edge guard portions 130 and 132 may each have a hardness in the range of 40 Shore A to 55 Shore D and the main body portion 128 may have a hardness of 50 Shore D or higher. In still another embodiment, edge guard portions 130 and 132 may each have a hardness in the range of 80 Shore A to 100 Shore A and the main body portion 128 may have a hardness of 60 Shore D or higher. In still other embodiments, edge guard portions 130 and 132 may each have a hardness of 95 Shore A and the main body portion 128 may have a hardness of 60 Shore D or higher.

A variety of materials may be used to construct the edge guard portions of spokes 114. For example, edge guard portions 130 and 132 may be constructed from polyurethanes, copolyesters, polyether block amides, polyolefin elastomers, and others. Main body portion 128 may be constructed from harder polyurethanes, copolyesters, polyether block amides, polyolefins, nylons, and others. One or more reinforcements, including inextensible reinforcements, may be present in main body portion 128 as well.

Various methods may be used to create spokes 114 having at least one edge guard portion 130 or 132. In one exemplary method, an edge guard portion is over molded onto the harder, main body portion 128 by a two shot or two step injection molding process where the material of one portion (the main body portion 128 or the edge guard portion) is first injected into the mold followed in quick succession by over molding the second portion onto the first.

In certain embodiments, each edge guard portion 130 or 132 has a certain width $W_E$ along axial direction A relative to the overall width $W_M$ of spoke 114 along axial direction A. For example, in certain embodiments, edge guard portion 130 or 132 may have a width $W_E$ that is in the range of 2 percent to 25 percent of the overall width $W_M$ of spoke 114. In still other embodiments, edge guard portion 130 or 132 may have a width $W_E$ that is in the range of 3 percent to 12 percent of the overall width $W_M$ of spoke 114.

Figure 4:
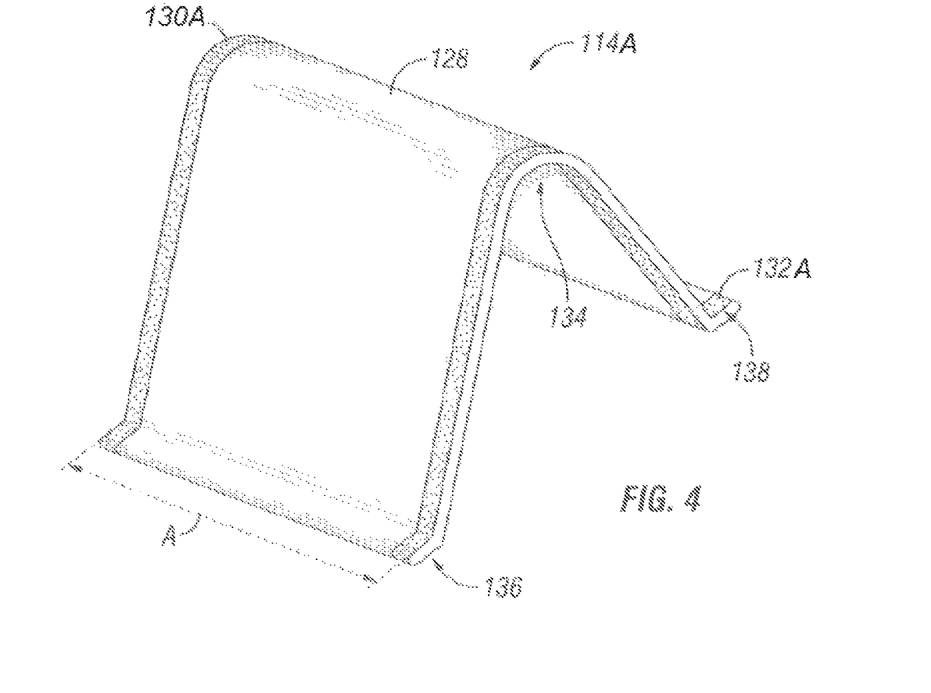
FIG. 4 is a perspective view of an exemplary load bearing member, or spoke, of the present invention.

FIG. 4 illustrates another exemplary embodiment of a spoke 114A as may be used with non-pneumatic wheel 100. As with previous embodiments, spoke 114A in FIG. 4 includes a main body portion 128 with softer edge portions 130A and 132A and, alternatively, could include just one softer edge portion 130A or 132A. A bend or fold 134 in spoke 114A provides for certain mechanical properties to be added to non-pneumatic wheel 100. Feet 126 and 128 are included for integrating spoke 114A into wheel 100. Other constructions for support structure 112 and spoke 114A may be used as well.

Exemplary embodiments of non-pneumatic wheel 100 may also include one or more features for discharging a build-up of static electricity on a vehicle. More particularly, non-pneumatic wheel 100 may be provided with a static discharge element for use in conducting electricity through the tire wheel 100 to prevent or reduce the chances of shocking a person touching the vehicle and to remove unwanted static electricity from the vehicle. The static discharge element can be located in the support structure 112 of the non-pneumatic tire 100 in order to transfer the electricity across the support structure 112, which may be otherwise composed of materials that have poor electrical conductive properties. The static discharge element is electrically conductive and may be made in a variety of manners. In some embodiments, the static discharge element is elastic so that it may function with support structures that are likewise elastic. In some embodiments, the static discharge element may be included in, or on, one or more spokes 114 along the main body portion, one or more edge guard portions, or both.

Figure 5:
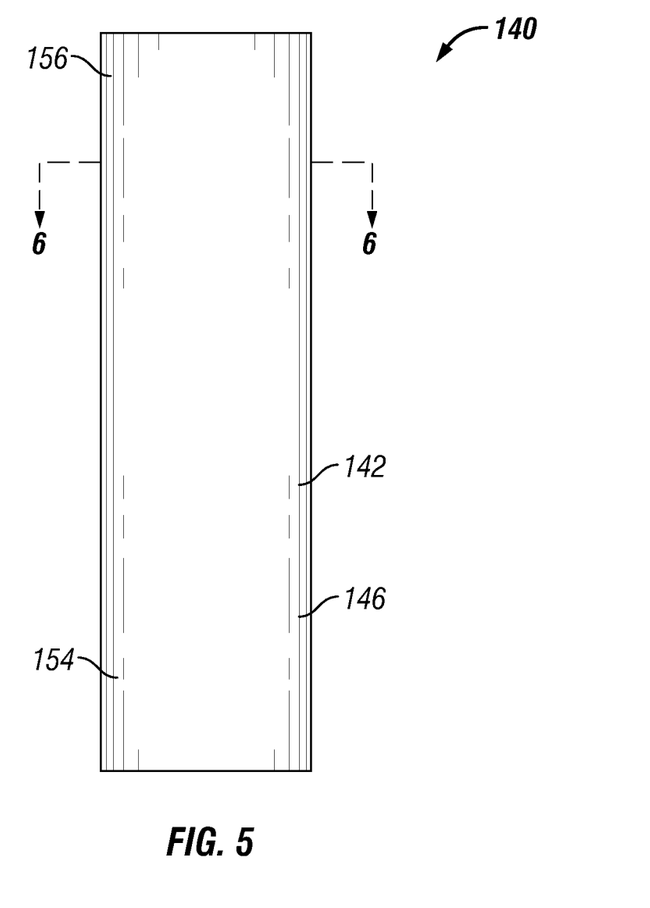
FIGS. 5 and 6 are side and end views, respectively, of an exemplary static discharge element of the present invention.
Figure 6:
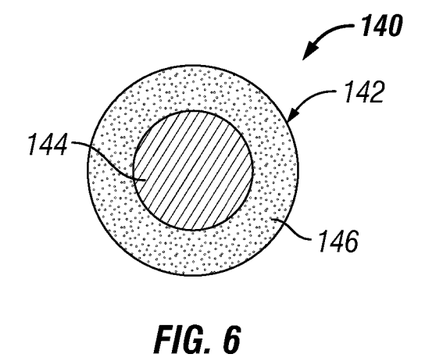
Figure 7:
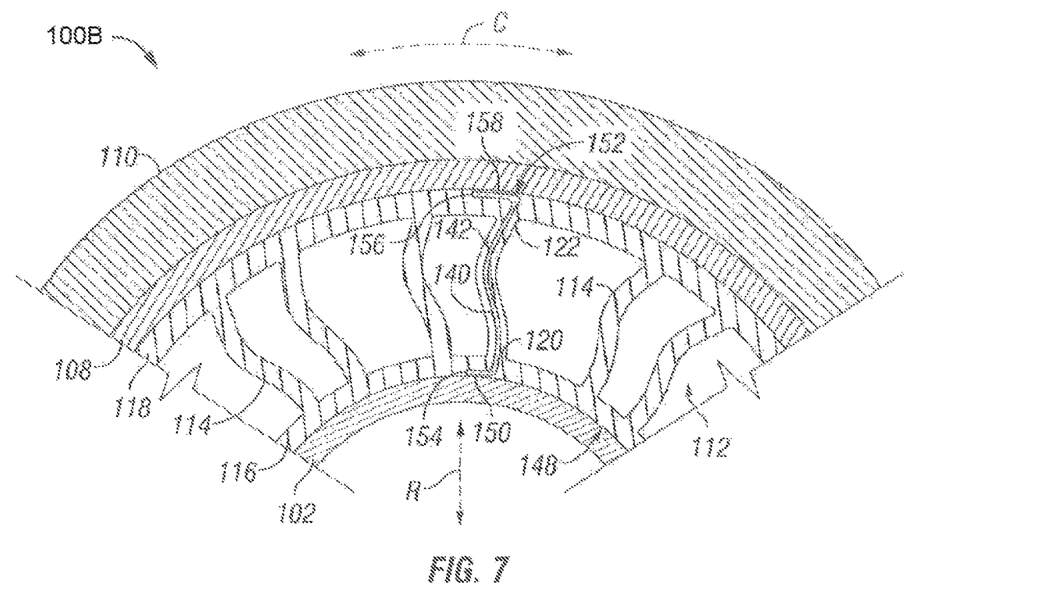
FIG. 7 is partial, cross-sectional side view of another exemplary non-pneumatic wheel of the present invention.

FIGS. 5 and 6 illustrate an exemplary embodiment of a static discharge element 140 configured as a filament 142. FIG. 7 provides a cross-sectional view of an arc-length portion along circumferential direction C of the exemplary embodiment of non-pneumatic wheel 100 of FIG. 1. Static discharge element 140 is located inside a spoke 114 and extends along radial direction R from hub 102 through spoke 114 to annular shear band 108. Static discharge element 140 may be included in all, or a subset of, spokes 114. Static discharge element 140 may extend through main body portion 128, one of edge guard portions 130 or 132, or both. In certain embodiments, static discharge element 140 may also be located within hub 102, annular shear band 108, or both. In other embodiments, as shown in FIG. 7, static discharge element 140 may simply engage (i.e. have electrically conducting contact therewith) hub 102 and shear band 108 and is not positioned inside of these elements. For each of these embodiments, static discharge element 140 allows electricity to be transferred from hub 102 to annular shear band 108 through one or spokes 114.

As stated, for the exemplary embodiment of FIGS. 5, 6, and 7, static discharge element 140 is provided as a filament 142 having a slender, thread-like shape. Filament 142 may have a circular cross-sectional shape, but other shapes are possible. Filament 142 may have a polymeric strand 144 and conductive carbon 146. Conductive carbon 146 may coat the length of polymeric strand 144 so as to cover the entire length of polymeric strand 144. In some embodiments, conductive carbon 146 may also coat the terminal top end and terminal bottom end of the polymeric strand 144 so that the polymeric strand 144 is completely covered on all sides by the conductive carbon 146. In some embodiments, polymeric strand 144 is suffused with conductive carbon 146. Polymeric strand 144 can have a circular cross-sectional shape, and conductive carbon 146 can have a circular cross-sectional shape with an inner void of circular cross-sectional shape filled with polymeric strand 144. Filament 142 may include any type of conductive particles to enable electrical conductivity. In some instances, the conductive particles may be powdered copper. The electrically conductive particles can be infused within other portions of filament 142. In some examples, filament 142 could be a conductive cable constructed from e.g., copper.

Polymeric strand 144 may be a synthetic polymer such as synthetic rubber, phenol formaldehyde resin, neoprene, nylon, polyvinyl chloride polystyrene, polyethylene, polypropylene, polyacrylonitrile, silicone, polyethylene terephthalate (PET), aramid, and hybrids of these as well. Polymeric strand 144 may also be a natural polymeric material such as natural rubber. Filament 140 may be configured as a monofilament, a multifilament yarn, a tow, or a staple.

To allow spoke 114 to flex during rotation of wheel 100, spoke 114 may have an elongation at break of 10 percent, although in other instances the elongation at break of spoke 114 may be from 0 percent to 5 percent, from 4 percent to 5 percent, from 5 percent to 15 percent, from 8 percent to 12 percent, from 9 percent to 11 percent, from 10 percent to 13 percent, from 10 percent to 15 percent, from 15 percent to 25 percent, up to 30 percent, or up to 50 percent.

Filament 142 may also have an elongation at break that is at least 10 percent so that filament 142 is likewise capable of stretching to accommodate stretching of spoke 114 in which it is carried. In other embodiments, filament 142 may have an elongation of from 0 percent to 5 percent, from 5 percent to 10 percent, from 10 percent to 15 percent, from 15 percent to 20 percent, from 20 percent to 25 percent, from 25 percent to 30 percent, from 30 percent to 35 percent, from 35 percent to 40 percent, from 40 percent to 45 percent, from 45 percent to 50 percent, from 50 percent to 55 percent, from 55 percent to 60 percent, or up to 60 percent, at least 2 percent, at least 4 percent, at least 5 percent, at least 8 percent, at least 10 percent, at least 15 percent, at least 20 percent, at least 25 percent, at least 30 percent, at least 35 percent, at least 40 percent, at least 45 percent, or at least 50 percent. The elongation numbers described may be the elongation of the component at break. In one exemplary embodiment, the elongation at break of the filament 142 is 41 percent. Spoke 114 may be designed so that carbon black is not present in areas of the spoke other than filament 142.

The electrical conductivity of the static discharge element 140 may be greater than that of spoke 114 so that electricity more easily flows through the static discharge element 140 than spoke 114. For example, spoke 114 may be made of polyurethane and thus may not have good electrical conductivity. The average electrical resistivity of static discharge element 140 may be $4 \times 10^5$ ohms-centimeter. In other arrangements, the average electrical resistivity of static discharge element 140 may be from $1 \times 10^5$-$4 \times 10^5$ ohms-centimeter, from $4 \times 10^5$-$1 \times 10^6$ ohms-centimeter, from $1 \times 10^6$-$5 \times 10^6$ ohms-centimeter, or up to $1 \times 10^{10}$ ohms-centimeter.

Where static discharge element 140 is constructed as filament 142, such may be RESISTAT® F902 Merge R022, which is manufactured by Jarden Applied Materials having offices located at 1451 Sand Hill Road, Enka, N.C., 28728, USA. In such case, filament 142 has a 22-denier nylon 6 monofilament 144, which has electrically conductive carbon 146 suffused onto the surface of the monofilament 144. Filament 142, in such case, has a round cross-section, and conductive carbon 146 has a thickness of 1 micron on monofilament 144. In one exemplary embodiment, the tenacity of such filament 142 is 5 grams/denier, the elongation at break is 41 percent, and the average electrical resistance per unit length is $4 \times 10^5$ ohms/centimeter. For example, filament 142 may have an average electrical resistance of $4 \times 10^5$ ohms per centimeter of filament length. The suffusion process chemically saturates the outer skin of the nylon monofilament 144 with the electrically conductive carbon particles 146. The conductive carbon 146 becomes part of the structure of the nylon monofilament 144, which retains the strength and flexibility of the nylon monofilament 144. The suffusion process results in a filament 144 with a durable, conductive sheath that does not crack or lose conductivity during flexing.

Although described as having conductive carbon 146 in the filament 142, other types of electrically conductive carbon may be included such as carbon nanotube (CNT), graphite, grapheme, or carbon black. Further, although described as having electrically conductive carbon in the filament, other types of fillers such as intrinsically conducting polymers, metal flake, or metallic fillers could be used for the purpose of conducting electricity through filament 142.

For the exemplary embodiment of FIG. 7, filament 142 extends through spoke 114 and also extends through inner interface ring 116 and outer interface ring 118. A first end 154 of filament 142 extends some distance along circumferential direction C along a radially-inner end 148 of the inner interface ring 116. First end 154 is located between the radially-inner end 148 and hub 102, which is electrically conductive or has components that are electrically conductive such that static discharge can occur. Adhesive 150 may be applied to first end 154 and hub 102 to attach these two elements. Adhesive 150 may be electrically conductive in order to allow electricity to flow from hub 102 into first end 154 of static discharge element 140. Adhesive 150 may have a concentration of carbon black of 23% weight, or may have a concentration of graphene of 2% weight.

Although described as being connected through the use of adhesive 150, any other form of attachment of first end 154 can be implemented. For example, a mechanical connection can be used to attach first end 154 of filament 142 to hub 102 or to inner interface ring 116. The mechanical connection can be electrically conductive as well in order to allow electricity to flow through hub 102 to first end 154. The connection need not be electrically conductive if first end 154 is placed against the hub 102 to cause electrical connectivity between first end 154 and hub 102.

A second end 156 of filament 142 extends along a length of a radially-outer end 152 of outer interface ring 118 along circumferential direction C. Second end 156 is located between radially-outer end 152 and shear band 108, which is electrically conductive along with tread 110 or have components that are electrically conductive such that static discharge can occur. Adhesive 158, which can be electrically conductive as described above with respect to adhesive 150, is used to attach second end 156 to shear band 108. As with first end 154, other types of connection, such as a mechanical connection, can be used to attach second end 156 to shear band 108. Electricity from filament 142 may flow through second end 156 and electrically conductive adhesive 158 into shear band 108 for subsequent discharge from non-pneumatic wheel 100. In some embodiments, adhesive 150 and 158 need not be used, and ends 154 and 156 can be placed into engagement with hub 102 and shear band 108 by other means. Further, although described as going through the interiors of the outer interface ring 118, spoke 114, and inner interface ring 116, filament 142 may be on the outside of one or more of these components in other configurations of the non-pneumatic wheel 100.

Figure 8:
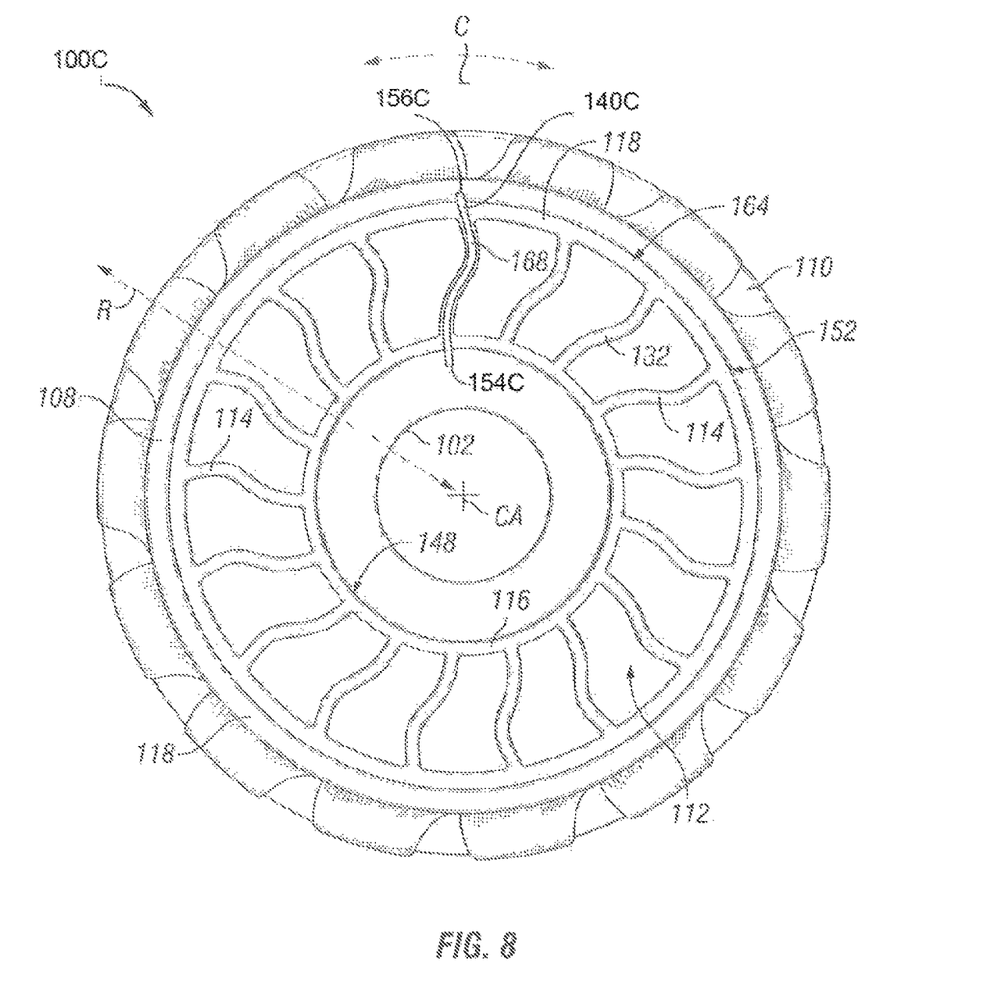
FIG. 8 is a side view of another exemplary non-pneumatic wheel of the present invention.

Another exemplary embodiment of non-pneumatic wheel 100C is shown in FIG. 8 and is configured in a manner similar to the one described with respect to FIG. 7. Support structure 112 includes an inner interface ring 116, a plurality of spokes 114, and an outer interface ring 118. For this embodiment, static discharge element 140C is an elastic electrically conductive tape 168 through which electricity may be conducted. Elastic electrically conductive tape 168 is located on an axial face 164 of the support structure 112. For this embodiment, tape 168 extends radially along one or both edge portions 130, 132 of a spoke 114. Elastic electrically conductive tape 168 is not located in the interior of support structure 112, but rather is located on the outside of support structure 112. Elastic electrically conductive tape 168 engages hub 102 and extends across inner interface ring 116, spoke 114, and outer interface ring 118. Elastic electrically conductive tape 168 also engages shear band 108 so that it is on the side faces of shear band 108 and hub 102 in along axial direction A. Electricity from hub 102 is conducted through elastic electrically conductive tape 168 and into shear band 108. Spoke 114 may be constructed so that carbon black is not present in the portions of the spoke 114 outside of the elastic electrically conductive tape 168, and in some instances may not be present at all in spoke 114 and elastic electrically conductive tape 168.

Elastic electrically conductive tape 168 extends along radial direction R and also changes course in circumferential direction C upon its extension outward in radial direction R. Elastic electrically conductive tape 168 could be applied to a mold surface before molding so that it is captured by material used to make support structure 112. However, in other embodiments, elastic electrically conductive tape 168 could be applied by adhesives or other means after formation of support structure 112 and other elements of the non-pneumatic wheel 100. Elastic electrically conductive tape 168 can stretch in one or more directions in order to accommodate deformation of the spoke 114 during normal use of non-pneumatic wheel 100.

Figure 9:
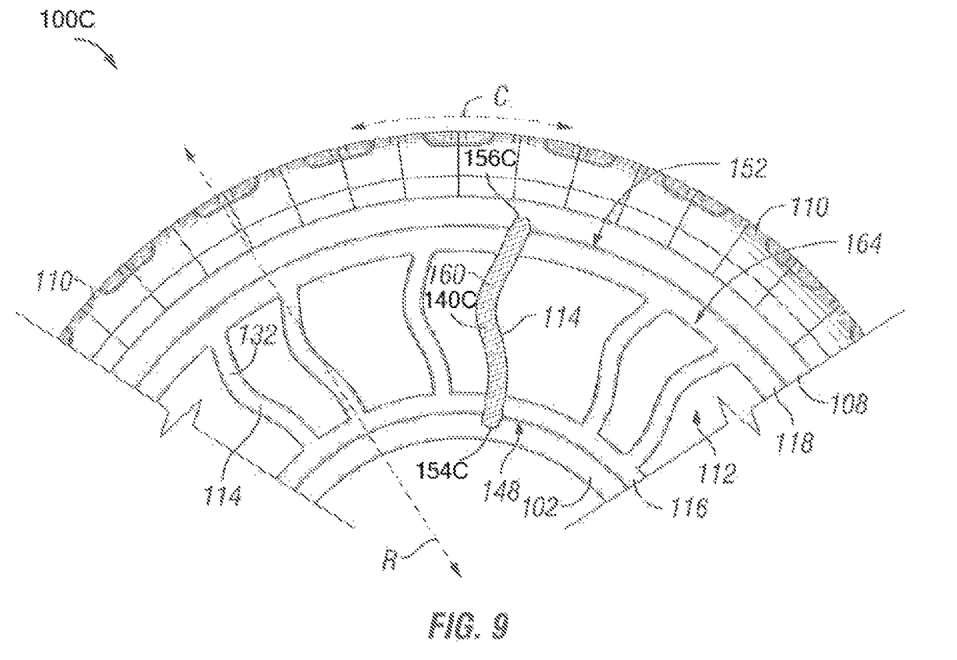
FIG. 9 is partial side view of another exemplary non-pneumatic wheel of the present invention

FIG. 9 shows an arc length portion along circumferential direction C of another exemplary embodiment of non-pneumatic wheel 100C. Support structure 112 again has inner interface ring 116, spokes 114, and outer interface ring 118. Static discharge element 140 is electrically conductive paint 160 that is located on axial face 164 of support structure 112. Electrically conductive paint 160 is also located on an axial face of hub 102 and on an axial face of shear band 108. Electrically conductive paint 160 is thus not found on the interior of the support structure 112, but is on an exterior surface of the support structure 112. For this exemplary embodiment, electrically conductive paint 160 can be applied directly onto one or both edge portions 130, 132 of one or more spokes 114, inner interface ring 116, and outer interface ring 118 after molding of these components. Electrically conductive paint 160 may also be applied to shear band 108 and hub 102 after they have been molded or otherwise formed. Electrically conductive paint 160 could alternatively be applied to a mold surface and then released during molding of the support structure 112. Electrically conductive paint 160 may be applied to an injection molded support structure 112 that does not have a release agent. Spokes 114 may be arranged so that carbon black is not present in portions of the spoke 114 outside of the electrically conductive paint 160, and spoke 114 may also be arranged so carbon black is not present at all either in the electrically conductive paint 160 or the portions of the spoke 114 outside of electrically conductive paint 160.

Figure 10:
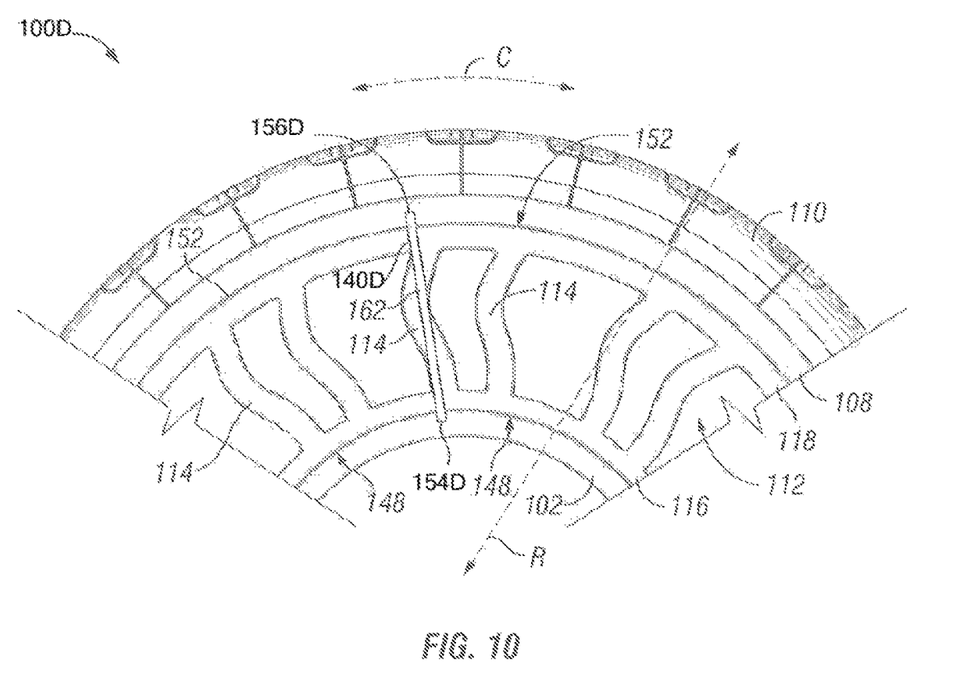
FIG. 10 is partial side view of another exemplary non-pneumatic wheel of the present invention.

Another alternative embodiment of non-pneumatic wheel 10013 is shown in FIG. 10 and includes a support structure 112 that again has spokes 114, inner interface ring 116, and outer interface ring 118. Static discharge element 140D is a strip of electrically conductive polymer 162. Support structure 112 and electrically conductive polymer 162 can be formed by a two shot injection molding process. A first shot applies the strip of electrically conductive polymer 162 onto the mold surface between hub 102 and annular shear band 108. A second shot completes the mold assembly by injecting inner interface ring 116, spokes 114, and outer interface ring 118. Electrically conductive polymer strip 162 is captured by spoke 114.

Electrically conductive polymer 162 may abut radially-inner end 148 and radially-outer end 152 of support structure 112 to put the electrically conductive polymer 162 into electrical communication with hub 102 and shear band 108. In the embodiment shown in FIG. 10, end 154 of the electrically conductive polymer 162 overlays the exterior surface of hub 102, and end 156 overlays side of shear band 108 to allow electricity to transfer into shear band 108. Electrically conductive polymer 162 may extend, for example, in a generally straight orientation in the radial direction R as shown, but it is to be understood that the electrically conductive polymer 162 may flex some degree in circumferential direction C during normal flexing of the spoke 114 during use. Spoke 114 may be provided so that carbon black is not present in portions of the spoke 114 outside of the electrically conductive polymer 162, and may alternatively be arranged so that carbon black is not present at all in the electrically conductive polymer 162 or in the portions of spoke 114 other than electrically conductive polymer 162. Electrically conductive polymer 162 may be positioned in one or both edge guard portions 130 and 132, in main body portion 128, or may be on the exposed axial end or face of edge guard portions 130 and/or 132.

Figure 11:
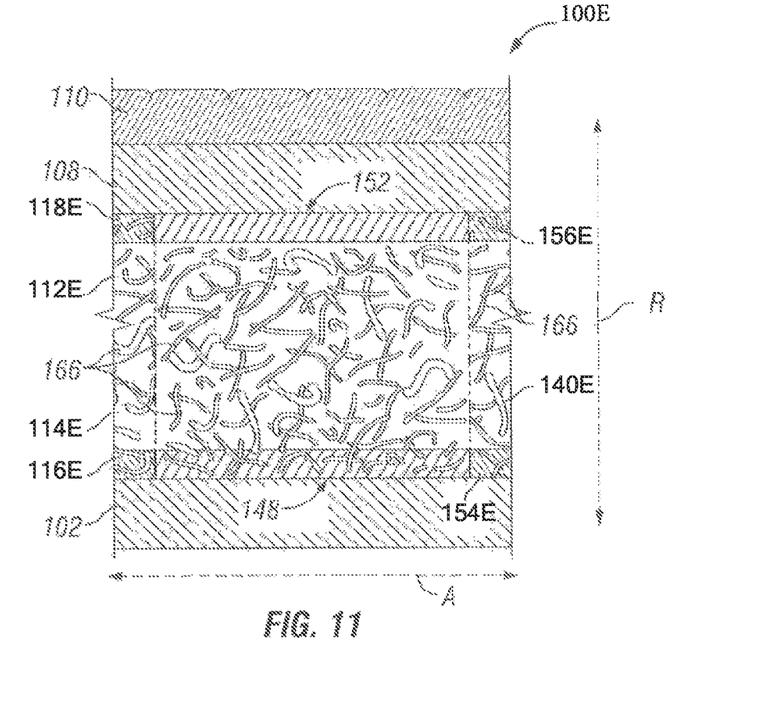
FIG. 11 is a schematic, cross-sectional view of the exemplary embodiment of a non-pneumatic wheel.

Another exemplary embodiment of a non-pneumatic tire 100E is shown in FIG. 11, which is a schematic, cross-sectional view of a non-pneumatic tire 100E taken between a pair of elements 114E along circumferential direction C such that no element 114E is part of the cross-section. For this exemplary embodiment, static discharge element 140E is a filament fiber 166 filler that is included within the other material of support structure 112E. Support structure 112E shown has an inner interface ring 116E, an outer interface ring 188, and a plurality of spokes 114E in this embodiment.

For example, components 114E, 116E, and 118E may be made of polyurethane. Filler made up of the filament fibers 166 may be included in the polyurethane of the components. Filament fibers 166 can be mixed into the polyurethane and distributed about the components 114, 116, and 118 as shown in FIG. 11. In other embodiments, 114E, 116E, and 118E and any other portions of support structure 122 can be made of reinforced and non-reinforced material such as a polymeric material. The polymeric material may be polyurethane, copolyester, polyether block amide and polyolefins. Still further, other embodiments of the non-pneumatic wheel 100E as described herein can include components such as spokes 114E, inner interface ring 116E, outer interface ring 118E, and support structure 122 that includes the different types of polymeric materials. Other types of materials may be included in the components such as polyurethane, copolyester, polyether block amide and polyolefins.

For the exemplary embodiment of FIG. 11, filament fibers 166 are include in both edge guard portions 130 and 132. However, in other embodiments, filament fibers may be included in one or more of portions 128, 130, and 132.

Filament fibers 166 may be from 2-7 millimeters in length and may have characteristics similar to filament 142 previously discussed in that they may be electrically conductive and can have the degrees of elasticity identified. The resulting spoke 114E may be capable of flexing the required amount and electricity may be conducted through spoke 114E as the overlapping filament fibers filament fibers form a pathway through which electricity can be conducted through the components 114E, 116E, and 118E.

Filament fibers 166 may be placed into support structure 112E throughout the entire support structure 112E so that the filament fibers 166 are found 360 degrees around support structure 112E in circumferential direction C. Alternatively, filament fibers 166 may be placed into only a section of support structure 112E so that they are found along only an arc length of support structure 112E in circumferential direction C and not 360 degrees around the central axis CA.

Although the various embodiments have been described as lacking carbon black in the portions of spoke 114 outside of static discharge element 140, carbon black could in fact be present in the portions of spoke 114 that are not static discharge element 140 in other versions of the non-pneumatic wheel 100. Embodiments discussed also show a single static discharge element 140 incorporated into the non-pneumatic wheel 100. It is to be understood that additional embodiments are possible in which multiple static discharge elements 140 are present on non-pneumatic wheel 100. For example, from 2-4, from 5-7, or up to 10 static discharge elements 140 may be present. One of, or multiple spokes 114, could have the various static discharge elements 140, and in some instances all of the spokes 114 of the wheel 100 have a static discharge element 140. Also, although some of the previously discussed embodiments have the static discharge element 140 located on a single axial face 164 of support structure 112, other embodiments are possible in which the opposite axial face of the support structure 112 likewise includes one or more of static discharge elements 140.

In still further exemplary embodiments, it should be understood that when more than one static discharge element 140 is present in the wheel 100, such may all be of the same type or may be of different types. For example, non-pneumatic wheel 100 could include both a filament 142 and filament fibers 166 in some embodiments. In other embodiments, non-pneumatic wheel 100 may have static discharge elements 140 that are filaments 142, elastic electrically conductive tape 168, and electrically conductive paint 160.

Spoke 114 and the variously discussed static discharge elements 140 may be capable of stretching. Static discharge element 140 may be able to elongate 10 percent before breaking, and in other instances the elongation of static discharge element 140 may be from 5 percent to 15 percent, from 8 percent to 12 percent, from 9 percent to 11 percent, from 10 percent-13 percent, from 10 percent-15 percent, from 15 percent to 25 percent, up to 30 percent, up to 40 percent, or up to 50 percent. Static discharge elements 140 may be able to elongate the same amount as the static discharge elements 140 so that, for instance, both spoke 114 and static discharge element 140 carried by spoke 114 can withstand an elongation during operation of up to 10 percent before break. Static discharge element 140 may be able to elongate a greater degree than the other portions of support structure 112, such as portions of the spoke 114 that are not static discharge element 140 in those instances in which support structure 112 does in fact include a spoke 114.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A non-pneumatic wheel defining axial, radial, and circumferential directions, the non-pneumatic wheel comprising:
   a cylindrically-shaped hub extending along the axial direction between opposing sides of the wheel;
   a compliant, load supporting annular shear band positioned radially-outward of the hub and concentric with the hub; and
   a support structure positioned radially-outward of the cylindrically-shaped hub and radially-inward of the annular shear band, the support structure comprising a plurality of spokes extending transversely over the hub between opposing sides of the wheel, each spoke having at least a pair of edges and a main body portion, wherein for each spoke at least one of the edges includes an edge guard portion having a lower Shore hardness than the main body portion;
   wherein for each spoke the at least one edge portion has a width along the axial direction that is in the range of 2 percent to 25 percent of an overall width along the axial direction of the spoke.

2. The non-pneumatic wheel of claim 1, wherein for each spoke both of the edges comprise an edge guard portion having a lower Shore hardness than the main body portion.

3. The non-pneumatic wheel of claim 1, wherein the at least one edge portion has a hardness in the range of 40 Shore A to 55 Shore D and the main body portion has a hardness of 50 Shore D or higher.

4. The non-pneumatic wheel of claim 1, wherein the at least one edge portion has a hardness in the range of 80 Shore A to 58 Shore D and the main body portion has a hardness of 60 Shore D or higher.

5. The non-pneumatic wheel of claim 1, wherein for each spoke the at least one edge guard portion has a width along the axial direction that is in the range of 3 percent to 12 percent of an overall width along the axial direction of the spoke.

6. The non-pneumatic wheel of claim 1, wherein the at least one edge guard portion comprises a static discharge element.

7. The non-pneumatic wheel of claim 6, wherein the static discharge element comprises a filament constructed from a polymeric strand and a conductive carbon.

8. The non-pneumatic wheel of claim 7, wherein the polymeric strand is nylon monofilament, and wherein the polymeric strand is suffused with the conductive carbon.

9. The non-pneumatic wheel of claim 8, wherein the filament has an average electrical resistivity of $4 \times 10^5$ ohms per centimeter.

10. The non-pneumatic wheel of claim 9, wherein the filament has an elongation at break of greater than 41 percent.

11. The non-pneumatic wheel of claim 1, the at least one edge guard portion includes a static discharge element comprising a strip of electrically conductive polymer.

12. The non-pneumatic wheel of claim 1, wherein the at least one edge guard portion is over-molded onto the main body portion by a two-step injection process.

13. The non-pneumatic wheel of claim 1, wherein the support structure comprises an inner interface ring and an outer interface ring.

14. The non-pneumatic wheel of claim 1, wherein the support structure comprises a static discharge element.

* * * * *